United States Patent
Han et al.

(10) Patent No.: US 11,586,034 B2
(45) Date of Patent: Feb. 21, 2023

(54) METHOD AND APPARATUS FOR ADJUSTING SCANNING STATUS

(71) Applicant: HUAWEI TECHNOLOGIES CO., LTD., Guangdong (CN)

(72) Inventors: Qingrui Han, Shenzhen (CN); Haili Li, Shenzhen (CN)

(73) Assignee: Huawei Technologies Co., Ltd., Guangdong (CN)

(*) Notice: Subject to any disclaimer, the term of this patent is extended or adjusted under 35 U.S.C. 154(b) by 1031 days.

(21) Appl. No.: 16/287,286

(22) Filed: Feb. 27, 2019

(65) Prior Publication Data

US 2019/0196180 A1 Jun. 27, 2019

Related U.S. Application Data

(63) Continuation of application No. PCT/CN2017/070996, filed on Jan. 12, 2017.

(30) Foreign Application Priority Data

Aug. 29, 2016 (CN) .......................... 201610753241.2

(51) Int. Cl.
*H04N 1/60* (2006.01)
*G02B 26/10* (2006.01)
(Continued)

(52) U.S. Cl.
CPC .............. *G02B 26/10* (2013.01); *G06T 7/80* (2017.01); *H04N 1/00183* (2013.01);
(Continued)

(58) Field of Classification Search
None
See application file for complete search history.

(56) References Cited

U.S. PATENT DOCUMENTS 8,830,380 B2 * 9/2014 Spielberg ............. H04N 5/2356 348/348
9,445,081 B1 * 9/2016 Kouperman ............. G06T 7/38
(Continued)

FOREIGN PATENT DOCUMENTS

| CN | 101087354 A | 12/2007 |
|---|---|---|
| CN | 101459784 A | 6/2009 |

(Continued)

OTHER PUBLICATIONS

Extended European Search Report issued in European Application No. 17844791.8 dated Jul. 1, 2019, 6 pages.
(Continued)

*Primary Examiner* — Dung D Tran
(74) *Attorney, Agent, or Firm* — Fish & Richardson P.C.

(57) ABSTRACT

Methods, systems, and devices for adjusting a scanning status are provided. In one example method, a mobile terminal can determine whether a target object is a preset target type. If so, a reference scan parameter is determined corresponding to the preset target type, and a real-time scan parameter is obtained that is used when the mobile terminal performs scanning around the target object. A determination is made as to whether the real-time scan parameter conforms to the reference scan parameter. If it does not, a prompt message used to prompt a user to adjust a scanning status corresponding to a current scan parameter is generated.

5 Claims, 2 Drawing Sheets

(51) Int. Cl.
*G06T 7/80* (2017.01)
*H04N 1/00* (2006.01)
*H04N 1/21* (2006.01)
*H04N 1/107* (2006.01)

(52) U.S. Cl.
CPC ..... *H04N 1/00824* (2013.01); *H04N 1/00827* (2013.01); *H04N 1/107* (2013.01); *H04N 1/215* (2013.01); *H04N 1/2125* (2013.01); *H04N 1/2145* (2013.01)

(56) References Cited

U.S. PATENT DOCUMENTS

| | | | |
|---|---|---|---|
| 9,639,943 B1* | 5/2017 | Kutliroff | G06T 7/55 |
| 2006/0262112 A1 | 11/2006 | Shimada | |
| 2007/0285754 A1 | 12/2007 | Lee et al. | |
| 2008/0067251 A1 | 3/2008 | Yoshimoto et al. | |
| 2009/0059023 A1* | 3/2009 | Sasaki | H04N 5/23219 |
| | | | 348/222.1 |
| 2010/0157280 A1 | 6/2010 | Kusevic et al. | |
| 2013/0225986 A1 | 8/2013 | Eggers et al. | |
| 2014/0002712 A1* | 1/2014 | Spielberg | H04N 5/23232 |
| | | | 348/E5.045 |
| 2014/0176418 A1 | 6/2014 | Ramachandran et al. | |
| 2016/0169659 A1 | 6/2016 | Steffey et al. | |
| 2016/0171335 A1* | 6/2016 | Aguilera Perez | G06V 10/20 |
| | | | 382/285 |
| 2017/0104919 A1* | 4/2017 | Konishi | H04N 5/232123 |
| 2017/0280038 A1 | 9/2017 | Ai et al. | |

FOREIGN PATENT DOCUMENTS

| | | |
|---|---|---|
| CN | 103200365 A | 7/2013 |
| CN | 203616780 U | 5/2014 |
| CN | 104125395 A | 10/2014 |
| CN | 104168837 A | 11/2014 |
| CN | 104620129 A | 5/2015 |
| CN | 105069804 A | 11/2015 |
| CN | 204963812 U | 1/2016 |
| WO | 2016095094 A1 | 6/2016 |

OTHER PUBLICATIONS

Office Action issued in Chinese Application No. 201610753241.2 dated Jul. 3, 2019, 8 pages.
Chinese Office Action issued in Chinese Application No. 201610753241.2 dated Apr. 4, 2018, 5 pages.
Chinese Search Report issued in Chinese Application No. 2016107532412 dated Mar. 27, 2018, 2 pages.
International Search Report and Written Opinion issued in International Application No. PCT/CN2017/070996 dated May 31, 2017, 19 pages.
Office Action issued in Chinese Application No. 202010925891.7 dated Mar. 8, 2021, 28 pages (with English translation).

\* cited by examiner

METHOD AND APPARATUS FOR ADJUSTING SCANNING STATUS

CROSS-REFERENCE TO RELATED APPLICATIONS

This application is a continuation of International Application No. PCT/CN2017/070996, filed on Jan. 12, 2017 which claims priority to Chinese Patent Application No. 201610753241.2, filed on Aug. 29, 2016, The disclosures of the aforementioned applications are hereby incorporated by reference in their entireties.

TECHNICAL FIELD

The present invention relates to the field of communications technologies, and in particular, to a method and an apparatus for adjusting a scanning status.

BACKGROUND

Three-dimensional (3D) reconstruction means building a mathematical model that is for a three-dimensional object and that is suitable for computer representation and processing, provides a basis on which the three-dimensional object is processed and operated and properties of the three-dimensional object are analyzed in a computer environment, and is also a key technology that builds a virtual reality for representing an objective world in a computer.

In computer vision, three-dimensional reconstruction is a process of reconstructing three-dimensional information based on a single-view or multi-view image. Because information of a single view is incomplete, three-dimensional reconstruction needs to take advantage of experience and knowledge. Multi-view three-dimensional reconstruction (similar to human binocular positioning) is relatively easy. The method is first calibrating a video camera, that is, calculating a relationship between an image coordinate system of the video camera and a world coordinate system, and then reconstructing three-dimensional information by using information in a plurality of two-dimensional images. General steps of three-dimensional reconstruction are as follows:

(1) Obtain an image sequence.
(2) Detect and match a feature point.
(3) Calculate a basic matrix.
(4) Calibrate a camera.
(5) Restore a projection matrix of the camera and compute external parameters of the camera.
(6) Obtain a three-dimensional point cloud.
(7) Reconstruct a network.
(8) Perform texture mapping.

Applying the 3D scanning technology to mobile terminals has become a research focus in the industry. Currently, a mobile terminal has no detection module when scanning an object to obtain a key frame, so that effect of the obtained key frame is poor, affecting 3D reconstruction. The key frame is an image frame that participates in 3D reconstruction. Because data of a plurality of frames is obtained during 3D scanning, if all scan data participates in 3D reconstruction, a reconstruction speed is severely affected. Generally, some frames are selected from the scan data for 3D reconstruction. The selected frames are referred to as key frames. Generally, there are two methods for selecting a key frame: One is to select a key frame based on time, that is, select a key frame at an interval of a fixed quantity of frames, and the other is to select a key frame based on space, that is, select a key frame at an interval of a rotation angle.

A method in the prior art is performing scanning around an object to obtain a key frame. However, during an implementation process in the prior art, a scanned object is collected completely based on subjective sensation of a user. Consequently, a blurry image is often collected, and a presented size of the scanned object changes greatly (a proportion of a target object to an overall image in a collection sequence changes greatly). A change in the presented size of the scanned object results in inaccurate matching of a feature point, affecting 3D reconstruction. Especially, when a camera moves too quickly during a scanning process, or a distance between the camera and the target object changes greatly, effect of the obtained key frame is relatively poor, affecting 3D reconstruction.

SUMMARY

In view of this, embodiments of the present invention provide a method and apparatus for prompting a user to adjust a scanning status.

According to a first aspect, an embodiment of the present invention provides a method for adjusting a scanning status, used to perform scanning around a target object to obtain a key frame of the target object, where the key frame is used to construct a 3D image of the target object; and the method includes:

determining a specific type of the target object; if the target object is a preset target type, determining a reference scan parameter of the target object; obtaining a real-time scan parameter used when a mobile terminal scans the target object; determining whether the real-time scan parameter conforms to the reference scan parameter; and generating a prompt message if the real-time scan parameter does not conform to the reference scan parameter, where the prompt message is used to prompt a user to adjust a scanning status corresponding to a current scan parameter. The target object may include a human face, an animal, a plant, and another static object. The specific type of the target object may be determined by entering a corresponding setting instruction by a user or by using an image recognition technology.

According to a second aspect, an embodiment of the present invention provides an apparatus for adjusting a scanning status, configured to perform scanning around a target object to obtain a key frame of the target object, where the key frame is used to construct a 3D image of the target object; and the apparatus includes:

a determining module, configured to: determine whether the target object is a preset target type, and if the target object is the preset target type, determine a reference scan parameter corresponding to the preset target type, where the reference scan parameter corresponding to the target object may be found in data stored locally or in cloud data;

an obtaining module, configured to obtain a real-time scan parameter used when the apparatus performs scanning around the target object;

a judging module, configured to determine whether the real-time scan parameter obtained by the obtaining module conforms to the reference scan parameter determined by the determining module; and a generation module, configured to generate a prompt message when the judging module determines that the real-time scan parameter does not conform to the reference scan parameter, where the prompt message is used to prompt a user to adjust a scanning status corresponding to a current scan parameter.

According to the technical solutions of the foregoing method and the foregoing apparatus provided in the embodiments of the present invention, the real-time scan parameter is obtained, the reference scan parameter is determined, and further the user is prompted to correct the scanning status based on an offset between the real-time scan parameter and the reference scan parameter, so as to properly adjust the current scanning status, such as a scanning distance, a scanning angle, and a scanning speed, and to obtain a key frame in better quality.

According to the first aspect or the second aspect, in a possible design, a scan parameter may be a distance (simply referred to as a scanning distance) from a scanning device to a scanned object (namely, the target object), a moving direction (simply referred to as a scanning direction) of the scanning device relative to the scanned object, a moving speed (simply referred to as a scanning speed) of the scanning device relative to the scanned object, a percentage (simply referred to as a picture proportion) of an image resolution corresponding to an area of a smallest rectangle in which a profile of the scanned object is located in an imaged picture obtained through scanning by the scanning device to an image resolution of the imaged picture, or the like. Each type of scan parameter of each target object has an optimal parameter value or value range, namely, the reference scan parameter. The reference scan parameter is often obtained through statistics collection based on a large quantity of historical empirical values. During an implementation process of the embodiments of the present invention, the reference scan parameter may be preset, or may be flexibly defined by a user. For example, the reference scan parameter may be prestored in a local memory or a cloud server.

A key frame obtained based on a preset parameter can be in higher definition.

According to the first aspect or the second aspect, in a possible design, a real-time scanning distance is obtained as the real-time scan parameter, and a scanning distance empirical value is obtained locally or from a cloud server. If the real-time scanning distance is greater than the scanning distance empirical value, a first prompt message is generated to prompt the user to approach the target object; or if the real-time scan parameter is less than the scanning distance empirical value, a second prompt message is generated to prompt the user to move away from the target object. The real-time scanning distance is a real-time distance of the mobile terminal relative to the target object during a process during which the mobile terminal performs circular scanning around the target object. This technology implementation may be completed by a processor by invoking a program instruction in a memory and processing and computing a scan parameter collected by a data collection system.

The technical solution may prompt the user to collect a clear key frame at a proper scanning distance.

According to the first aspect or the second aspect, in a possible design, a real-time picture proportion used when the target object is scanned is obtained as the real-time scan parameter; a preset picture proportion is obtained, where a picture proportion is a percentage of an image resolution corresponding to a smallest rectangle in which a portrait profile is located in an imaged picture to an image resolution of the imaged picture; and if the real-time picture proportion is less than the preset picture proportion, a third prompt message is generated to prompt the user to approach the target object; or if the real-time picture proportion is greater than the preset picture proportion, a fourth prompt message is generated to prompt the user to move away from the target object. The real-time picture proportion is a percentage of an image resolution of a smallest rectangle in which a profile of the target object is located in a real-time imaged picture of the mobile terminal to an image resolution of the entire imaged picture. This technology implementation may be completed by a processor by invoking a program instruction in a memory and processing and computing a scan parameter collected by a data collection system.

The technical solution may prompt the user to collect a clear key frame at a proper scanning distance.

According to the first aspect or the second aspect, in a possible design, a preset scanning speed is determined, and a real-time scanning speed is obtained. If the real-time scanning speed is greater than the preset scanning speed, a sixth prompt message is generated to prompt the user to reduce the speed of scanning the target object. The real-time scanning speed is a real-time moving speed of the mobile terminal during a process during which the mobile terminal performs circular scanning around the target object. This technology implementation may be completed by a processor.

The technical solution may prompt the user to perform scanning at a slow moving speed, to avoid a deteriorated key frame caused by a quick scan.

According to a third aspect, a device for prompting a user to adjust a scanning status is provided, and the device includes a memory, a processor, and a data collection system. The memory, the processor, and the data collection system are connected by using a bus for communication. The memory stores a program instruction. The data collection system is configured to obtain external image information, and can also obtain a real-time scan parameter used when a target object is scanned, such as at least one piece of the following information: speed information, distance information, and direction information. The processor invokes the program instruction to: determine whether the target object is a preset target type; if the target object is the preset target type, determine a reference scan parameter corresponding to the preset target type; determine whether the real-time scan parameter conforms to the reference scan parameter; and generate a prompt message if the real-time scan parameter does not conform to the reference scan parameter, where the prompt message is used to prompt a user to adjust a scanning status corresponding to a current scan parameter. In addition, the processor may perform any one of the foregoing possible implementations by invoking the program instruction in the memory.

According to a fourth aspect, an embodiment of the present invention provides a mobile terminal, where the mobile terminal has corresponding functions of implementing the foregoing methods. The functions may be implemented by hardware, or implemented by executing corresponding software by hardware. The hardware or software includes one or more modules that correspond to the foregoing functions.

According to a fifth aspect, an embodiment of the present invention provides a computer storage medium, configured to store a computer software instruction used in an operation of the foregoing mobile terminal, where the computer software instruction includes a program designed for performing the foregoing aspects.

The technical solutions in any one of the foregoing possible designs may be combined without going against nature. For example, in a possible design, obtaining, comparison, and prompt message generation for the foregoing different types of scan parameters may be simultaneously performed. For example, when a real-time scanning distance is compared with a preset scanning distance, a real-time scanning speed may be compared with a preset scanning speed.

DESCRIPTION OF EMBODIMENTS

Embodiments of the present invention provide a method and an apparatus for adjusting a scanning status.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, restrictive words used in this application, such as "first", "second", "preset", and "target", are used merely for the purpose of convenient and clear description and for differentiating general terms, but do not indicate a particular order and are not dedicated words.

The embodiments of the present invention are mainly applied to a scenario in which a mobile terminal performs 3D reconstruction (simply referred to as reconstruction) on a single scanned object, to obtain a key frame of the scanned object. During reconstruction, scanning usually needs to be performed around a target object for which a picture is to be taken and framing is to be performed. Scanning means performing shooting or burst shooting on the target object. An ideal scanning mode is to perform scanning around in a circle. During a specific implementation process, an operation error is allowed in a circular scan track, and an oval track pattern or another scan track pattern approximate to a circle may appear. Currently, a mobile terminal performs scanning based only on perception of a user during data collection, without any operation instruction. Due to errors in self-perception of the user, key frames that are obtained during scanning are often in poor quality. In the present invention, the mobile terminal obtains a real-time scan parameter, and when it is detected that the real-time scan parameter does not conform to a preset scan parameter, prompts a user to adjust a scanning status in real time, to obtain an ideal key frame.

Figure 1:
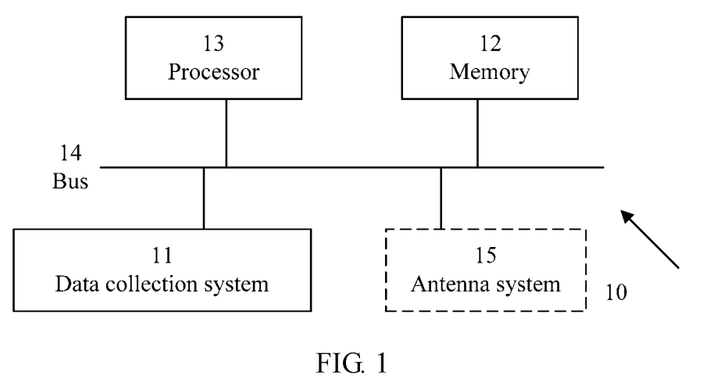
FIG. 1 is a schematic structural diagram of a device for adjusting a scanning status according to an embodiment of the present invention.

In the embodiments of the present invention, a key frame needs to be obtained by a mobile terminal (or may be referred to as a scanning device, a scanning terminal, a mobile device, or the like). The mobile terminal may be an intelligent terminal, or a particular image collection system. FIG. 1 is a schematic structural diagram of a device for adjusting a scanning status. The mobile terminal includes at least a data collection system 11, a memory 12, a processor 13, and a bus 14.

The data collection system 11 includes a plurality of sensors, such as an array camera, a gyroscope, an accelerometer, and/or another sensor having a particular function (for example, a distance measurement sensor and a speed measurement sensor). The data collection system 11 may collect and obtain external information, including an external color image, posture information (a distance from a scanning device to a scanned object, a moving direction of a scanning device relative to a scanned object (namely, a target object), and a moving speed of a scanning device relative to a scanned object) of a terminal, and the like. In addition to a sensor, a data collection system having richer functions may further include some small processing units and storage units.

The memory 12 is configured to store a program and various data, and mainly store a software unit, such as an operating system, an application, and a function instruction, or store subsets or extension sets of the operating system, application, function instruction, and the like. The memory 12 may further include a nonvolatile random access memory, provide hardware, software, and data resources for managing a computing and processing device to the processor 13, and support control software and an application.

The processor 13 is configured to generate a corresponding operation control signal, send the signal to a corresponding part of the computing and processing device, and read and process data in software, especially read and process the data and program in the memory 12, so that each function module in the computing and processing device performs a corresponding function, and the corresponding part is controlled to act as required by an instruction. Therefore, the processor 13 may invoke some program instructions in the memory 12 to compute and process information collected by the data collection system 11, so as to complete the following technical solutions mentioned in the present invention and an equivalent replacement solution.

The bus 14 is used to allow the foregoing hardware units 11 to 13 to be electrically connected for communication. During a specific implementation process, the mobile terminal may further include an antenna system 15, configured to transceive a wireless communication signal to implement wireless communication with a mobile communications network. The mobile communications network includes one or more of the following: a GSM network, a CDMA network, a 3G network, an FDMA network, a TDMA network, a PDC network, a TACS network, an AMPS network, a WCDMA network, a TDSCDMA network, a WIFI network, and an LTE network. In addition, the mobile terminal may further include another hardware structure, such as a Wi-Fi connection module, a display screen, and an audio component.

Figure 2:
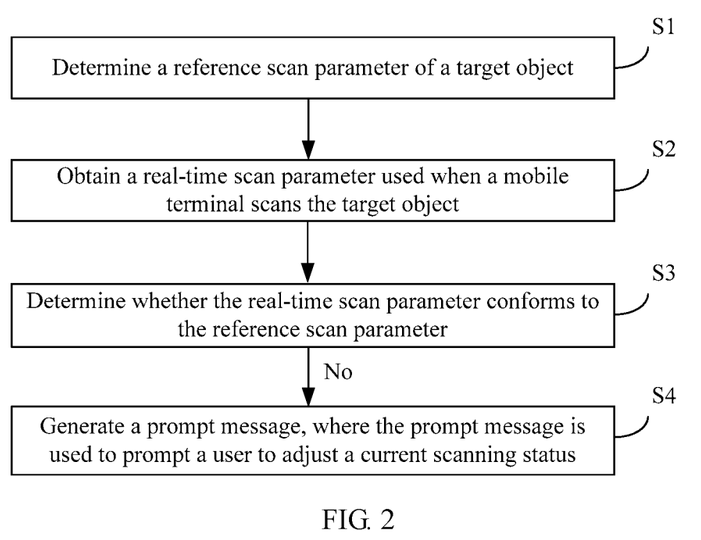
FIG. 2 is a flowchart of a method for adjusting a scanning status according to an embodiment of the present invention.

Referring to FIG. 2, a method for adjusting a scanning status is provided. The method is applied when a mobile terminal performs circular scanning around a target object to obtain a key frame of the target object. A specific implementation is as follows.

S1: Determine a reference scan parameter of a target object.

The target object is an object for which a key frame is obtained, namely, a scanned object. Usually, scan parameters that affect quality of the key frame include a scanning distance, a scanning direction, and a scanning speed of the mobile terminal relative to the target object when the mobile terminal performs scanning around the target object, and the like. Based on historical scanning experience, each type of scan parameter of each type of target object has an optimal parameter value or value range. An optimal distance empirical value may be a specific value, or may be a value range having a proper offset. The optimal distance empirical value may be preset, or may be flexibly defined by a user. The target object may include a human face, an animal, a plant, and another static object. For ease of description, in the following embodiments, a corresponding method is described by using a portrait as the target object.

In an implementation scenario, the mobile terminal is a device specially configured to scan a portrait. All reference scan parameters corresponding to the portrait are prestored in the device, and may be obtained by a processor of the mobile terminal. The prestored reference scan parameters may be preset by a user.

In another implementation scenario, the mobile terminal may be configured to scan a plurality of objects, and therefore, during scanning of an object, the mobile terminal needs to determine a type of the object being scanned, that is, to determine whether the target object is a preset target type. For example, the mobile terminal determines whether the target object is a human being, a cat, or a desk. This may be implemented by entering a corresponding setting instruction by a user or by using mature image recognition technology, or by entering a definite object type by a user to inform the terminal. After it is recognized that the object type is a portrait, the processor may invoke preset data in a data collection system or a local memory, or access preset data in a cloud server, to query whether there is an empirical value of a scan parameter corresponding to the portrait. Correspondingly, the foregoing empirical value may also be prestored in the data collection system, the cloud server, or the local memory, and is invoked by the processor.

During a specific implementation process, if the scan parameter is a scanning distance, whether there is a scanning distance empirical value that corresponds to the portrait may be first determined. The scanning distance empirical value of the portrait may range from 40 cm to 50 cm (including 40 cm and 50 cm). The scanning distance is a distance of the mobile terminal relative to the portrait during a process during which the mobile terminal performs circular scanning around the portrait.

During a specific implementation process, alternatively, an optimal scanning distance may be indirectly determined by using a real-time picture proportion used when the portrait is scanned. Therefore, a preset picture proportion corresponding to the portrait may be obtained, and the preset picture proportion is usually a specific value between 40% and 80% or a value subrange. The picture proportion is a percentage of an image resolution corresponding to a smallest rectangle in which a portrait profile is located in an imaged picture obtained through scanning by the mobile terminal to an image resolution of the imaged picture. Specifically, an image obtained through scanning has an image resolution, for example, the image resolution of an entire imaged picture is 1920*1080. The image includes a portrait that needs to be reconstructed. A smallest rectangle that can encircle the portrait profile is used as a marker box to mark a head region in the imaged picture, and a percentage of the image resolution (for example, 1200*800) corresponding to the smallest rectangle to the image resolution 1920*1080 of the imaged picture is the picture proportion. The picture proportion is for the image obtained through scanning by the mobile terminal, but has no direct relationship with a display screen. Therefore, the preset picture proportion may be used as a reference for image scanning.

S2: Obtain a real-time scan parameter used when the mobile terminal scans the target object.

The data collection system of the mobile terminal collects data, and sends the data to the processor for subsequent processing.

The data collection system of the mobile terminal may include: an array camera, a gyroscope, an accelerometer, another sensor having a particular function (for example, a distance measurement sensor and a speed measurement sensor), and the like. The array camera may obtain external color images, and the gyroscope, the accelerometer, and the another sensor having a particular function may obtain scanning distance information, scanning angle information, scanning speed information, scanning direction information, and the like of the mobile terminal. The data collection can be performed by using existing mature technologies, and the technologies are not described in detail or listed in this application.

Information such as a real-time scanning distance, a real-time scanning direction, and a real-time scanning speed of the mobile terminal may be obtained by using the data collection system. The real-time scanning distance is a real-time distance of the mobile terminal relative to the portrait during a process during which the mobile terminal performs circular scanning around the portrait; the real-time picture proportion is a percentage of an image resolution of a smallest rectangle in which a portrait profile is located in a real-time imaged picture of the mobile terminal to an image resolution of the imaged picture; and the real-time scanning speed is a real-time moving speed of the mobile terminal during a process during which the mobile terminal performs circular scanning around the portrait.

S3: Determine whether the real-time scan parameter conforms to the reference scan parameter.

The processor compares the real-time scan parameter in S2 with the corresponding reference scan parameter in S1, to determine whether the real-time scan parameter conforms to the reference scan parameter. If the real-time scan parameter conforms to the reference scan parameter, no prompt is provided for adjusting a current scanning status; or if the real-time scan parameter does not conform to the reference scan parameter, S4 is performed.

S4: Generate a prompt message, where the prompt message is used to prompt a user to adjust a scanning status corresponding to a current scan parameter.

In an example, if the processor determines that the real-time scanning distance is greater than the scanning distance empirical value, a prompt message is generated to prompt the user to move the mobile terminal to approach the portrait; or if the processor determines that the real-time scanning distance is less than the scanning distance empirical value, a prompt message is generated to prompt the user to move the mobile terminal away from the portrait. The prompt may help obtain a clear key frame that has a good picture proportion.

In another example, if the processor determines that the real-time picture proportion of the portrait during a scanning process is less than the preset picture proportion, a prompt message is generated to prompt the user to move the mobile terminal to approach the portrait; or if the processor determines that the real-time picture proportion of the scanned object is greater than the preset picture proportion, a prompt message is generated to prompt the user to move the mobile terminal away from the portrait. The prompt may help obtain a clear key frame that has a good picture proportion.

In another example, if the processor determines that a real-time scanning speed of the mobile terminal during a scanning process is greater than a preset scanning speed, a prompt message is generated to prompt the user to reduce a speed at which the mobile terminal scans the target object. The real-time scanning speed may be an instantaneous linear velocity or an instantaneous angular velocity. A coordinate system on which calculation of the linear velocity or the angular velocity relies uses the portrait as the center of a circle, and uses a distance from the mobile terminal to the portrait as an approximate radius. For example, if the real-time scanning speed is greater than a first radian per second, the user is prompted to slow down the collection, so that a collected key frame is in higher definition. A typical value of the first radian is 1.5 radians. The first radian is a historical empirical value obtained through statistics, and may be preset by the user. The prompt can avoid an unclear picture caused by a quick scan.

In conclusion, by invoking a program or an instruction stored in the memory 12, the processor 13 may perform some computing and processing on a real-time scan parameter obtained by a sensor, to perform methods and equivalent methods mentioned in the foregoing method embodiments.

By using the method embodiments provided in the present invention, the type of the scanned object is determined and the corresponding reference scan parameter is obtained based on the type of the scanned object; and the real-time scan parameter of the mobile terminal is determined, and further a prompt message for adjusting a current incorrect scanning status is generated based on an offset between the real-time scan parameter and the reference scan parameter, so as to properly adjust the current scan parameter, such as the real-time scanning distance, the real-time picture proportion, and the real-time scanning speed, and to obtain a good key frame subsequently.

Figure 3:
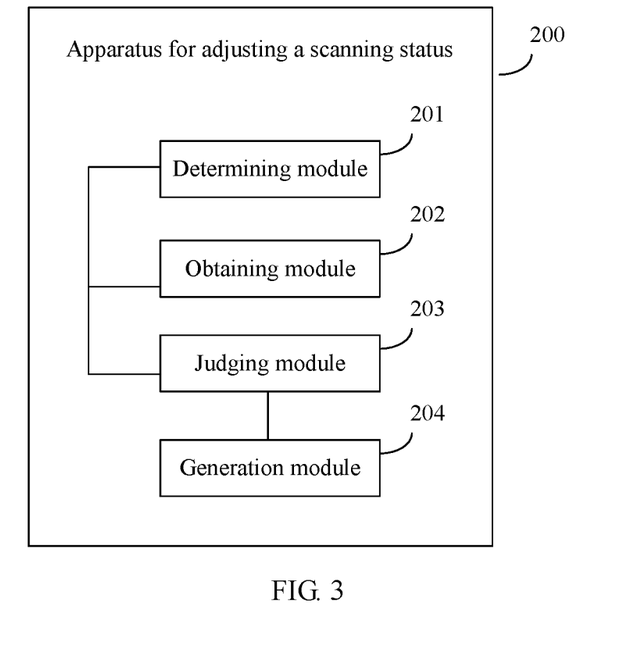
FIG. 3 is a schematic diagram of an apparatus for adjusting a scanning status according to an embodiment of the present invention.

FIG. 3 shows an apparatus for adjusting a scanning status according to an embodiment of the present invention. The apparatus may be an intelligent terminal, configured to perform scanning around a target object to obtain a key frame of the target object, where the key frame is used to construct a 3D image of the target object. The apparatus 200 includes a determining module 201, an obtaining module 202, a judging module 203, and a generation module 204.

The determining module 201 is configured to determine a reference scan parameter of the target object. The determining module may be implemented by a processor by invoking data in a local memory or a cloud server, or may be jointly implemented by a processor and a data collection system, for example, the processor determines whether the target object is a preset target object based on a picture that is taken in real time and that is collected by the data collection system, and if the target object is the preset target object, the processor may invoke data in a local memory or a cloud server to obtain the reference scan parameter.

The obtaining module 202 is configured to obtain a real-time scan parameter used when a mobile terminal scans the target object. The obtaining module may be implemented by the data collection system, for example, by at least one of the following: an array camera, a gyroscope, an accelerometer, and a sensor having a particular function (for example, a distance measurement sensor and a speed measurement sensor).

The judging module 203 is configured to determine whether the real-time scan parameter obtained by the obtaining module 202 conforms to the reference scan parameter determined by the determining module 201. The judging module may be implemented by the processor for performing a comparison operation.

The generation module 204 is configured to generate a prompt message when the judging module 203 determines that the real-time scan parameter does not conform to the reference scan parameter, where the prompt message is used to prompt a user to adjust a scanning status corresponding to a current scan parameter. The generation module may be implemented in the processor, and the processor may present the prompt message subsequently by using output hardware, such as a loudspeaker and a display.

During a specific implementation process, the determining module 201 is specifically configured to perform the method mentioned in S1 and an equivalent replacement method. The obtaining module 202 is specifically configured to perform the method mentioned in S2 and an equivalent replacement method. The judging module 203 is specifically configured to perform the method mentioned in S3 and an equivalent replacement method. The generation module 204 is specifically configured to perform the method mentioned in S4 and an equivalent replacement method. The foregoing specific method embodiments and explanations and expressions in the embodiments are also applied to method execution in the apparatus.

According to the apparatus for prompting a user to adjust a scanning status provided in the embodiment of the present invention, the obtaining module may obtain the real-time scan parameter, the determining module is configured to determine the reference scan parameter, and when the judging module determines that an offset exists between the real-time scan parameter and the reference scan parameter, the generation module generates a prompt message for correcting the scanning status based on the offset, so as to appropriately adjust a current scanning distance, scanning angle, and/or scanning speed of the mobile terminal, and to obtain a good key frame subsequently for corresponding 3D reconstruction.

A person of ordinary skill in the art may understand that all or some of the steps of the foregoing methods may be implemented by a program instructing relevant hardware. The program may be stored in a computer readable storage medium. With descriptions of the foregoing implementations, a person skilled in the art may clearly understand that the present invention may be implemented by hardware, firmware or a combination thereof.

The foregoing embodiments are merely example embodiments of the technical solutions of the present invention, but are not intended to limit the protection scope of the present invention. Any modification, equivalent replacement, or improvement made without departing from the spirit and principle of the present invention shall fall within the protection scope of the present invention.

What is claimed is:

1. A method for adjusting a scanning status used to perform scanning around a target object to obtain a key frame of the target object, wherein the key frame is used to construct a 3D image of the target object, and the method comprises:
   determining, by a mobile terminal, whether the target object is a preset target type;
   in response to determining that the target object is the preset target type, determining a reference scan parameter corresponding to the preset target type;
   obtaining a real-time scan parameter used when the mobile terminal performs circular scanning around the target object;
   determining whether the real-time scan parameter conforms to the reference scan parameter; and
   in response to determining that the real-time scan parameter does not conform to the reference scan parameter, generating a prompt message, wherein the prompt message is used to prompt a user to adjust a scanning status corresponding to a current scan parameter; and wherein if the preset target type is a portrait, the determining a reference scan parameter corresponding to the target object comprises:
  obtaining a preset picture proportion corresponding to the portrait to use the preset picture proportion as the reference scan parameter, wherein the picture proportion is a percentage of an image resolution corresponding to a smallest rectangle in which a portrait profile is located in an imaged picture to an image resolution of the imaged picture;
wherein the obtaining a real-time scan parameter used when the mobile terminal performs scanning around the target object comprises:
  obtaining a real-time picture proportion of the portrait generated when the mobile terminal scans the portrait, wherein the real-time picture proportion is a percentage of an image resolution corresponding to an area of a smallest rectangle in which a portrait profile is located in a real-time imaged picture of the mobile terminal to an image resolution of the imaged picture; and
wherein the generating a prompt message in response to determining that the real-time scan parameter does not conform to the reference scan parameter comprises:
  generating a first prompt message if the real-time picture proportion is less than the preset picture proportion, wherein the first prompt message is used to prompt the user to move the mobile terminal to approach the target object; or
  generating a second prompt message if the real-time picture proportion is greater than the preset picture proportion, wherein the second prompt message is used to prompt the user to move the mobile terminal away from the target object; or
wherein if the preset target type is a portrait, the determining a reference scan parameter corresponding to the preset target type comprises:
  obtaining a preset scanning speed corresponding to the portrait to use the preset scanning speed as the reference scan parameter;
wherein the obtaining a real-time scan parameter used when the mobile terminal performs scanning around the target object comprises:
  obtaining a real-time scanning speed used when the mobile terminal scans the target object, wherein the real-time scanning speed is a real-time moving speed of the mobile terminal during a process during which the mobile terminal performs scanning around the portrait; and
wherein the generating a prompt message in response to determining that the real-time scan parameter does not conform to the reference scan parameter comprises:
  generating a third prompt message if the real-time scanning speed is greater than the preset scanning speed, wherein the third prompt message is used to prompt the user to reduce the moving speed of the mobile terminal.

2. An apparatus for adjusting a scanning status, the apparatus configured to perform scanning around a target object to obtain a key frame of the target object, wherein the key frame is used to construct a 3D image of the target object, and wherein the apparatus comprises:
  at least one processor; and
  a non-transitory computer-readable storage medium coupled to the processor and storing programming instructions for execution by the at least one processor, the programming instructions instruct the at least one processor to:
  determine whether the target object is a preset target type;
  in response to determining that the target object is the preset target type, determine a reference scan parameter corresponding to the preset target type;
  obtain a real-time scan parameter used when the apparatus performs circular scanning around the target object;
  determine whether the obtained real-time scan parameter conforms to the reference scan parameter; and
  generate a prompt message in response to determining that the real-time scan parameter does not conform to the reference scan parameter, wherein the prompt message is used to prompt a user to adjust a scanning status corresponding to a current scan parameter; and
wherein if the preset target type is a portrait, determining a reference scan parameter corresponding to the target object comprises obtaining a preset picture proportion corresponding to the portrait to use the preset picture proportion as the reference scan parameter, wherein the picture proportion is a percentage of an image resolution corresponding to a smallest rectangle in which a portrait profile is located in an imaged picture to an image resolution of the imaged picture;
  wherein obtaining a real-time scan parameter used when the apparatus performs scanning around the target object comprises obtaining a real-time picture proportion of the portrait generated when the apparatus scans the portrait, wherein the real-time picture proportion is a percentage of an image resolution corresponding to an area of a smallest rectangle in which a portrait profile is located in a real-time imaged picture of the apparatus to an image resolution of the imaged picture; and
  wherein generating a prompt message in response to determining that the real-time scan parameter does not conform to the reference scan parameter comprises:
    generate a first prompt message if the real-time picture proportion is determined to be less than the preset picture proportion, wherein the first prompt message is used to prompt the user to move the apparatus to approach the target object; or
    generate a second prompt message if the real-time picture proportion is determined to be greater than the preset picture proportion, wherein the second prompt message is used to prompt the user to move the apparatus away from the target object; or
wherein if the preset target type is a portrait, determining a reference scan parameter corresponding to the target object comprises obtaining a preset scanning speed corresponding to the portrait to use the preset scanning speed as the reference scan parameter;
  wherein obtaining a real-time scan parameter used when the apparatus performs scanning around the target object comprises obtaining a real-time scanning speed used when the apparatus scans the portrait, wherein the real-time scanning speed is a real-time moving speed of the apparatus during a process during which the apparatus performs scanning around the portrait; and wherein generating a prompt message in response to determining that the real-time scan parameter does not conform to the reference scan parameter comprises:
    generating a third prompt message if the real-time scanning speed is determined to be greater than the preset scanning speed, wherein the third prompt message is used to prompt the user to reduce the moving speed of the apparatus.

3. A mobile device, wherein the device comprises a memory, at least one processor, a bus, and a data collection system, wherein the memory, the at least one processor, and the data collection system are connected by using the bus for communication, wherein the data collection system is configured to scan, under control of the at least one processor, a target object to obtain a key frame of the target object, wherein the key frame is used to construct a 3D image of the target object, and wherein:

the memory is configured to store a program instruction; and the at least one processor invokes the program instruction to:

when the data collection system scans the target object, determine whether the target object is a preset target type;

in response to determining that the target object is the preset target type, determine a reference scan parameter corresponding to the preset target type;

obtain, by using the data collection system, a real-time scan parameter used when the target object is scanned;

determine whether the real-time scan parameter obtained by the data collection system conforms to the reference scan parameter; and generate a prompt message if the real-time scan parameter does not conform to the reference scan parameter, wherein the prompt message is used to prompt a user to adjust a circular scanning status corresponding to a current scan parameter; and wherein if the preset target type is a portrait, the determining a reference scan parameter corresponding to the preset target type comprises:

obtaining a preset picture proportion corresponding to the portrait to use the preset picture proportion as the reference scan parameter, wherein the picture proportion is a percentage of an image resolution corresponding to a smallest rectangle in which a portrait profile is located in an imaged picture to an image resolution of the imaged picture;

wherein the obtaining a real-time scan parameter used when the target object is scanned comprises:

obtaining a real-time picture proportion used when the mobile device scans the portrait, wherein the real-time picture proportion is a percentage of an image resolution corresponding to an area of a smallest rectangle in which a portrait profile is located in a real-time imaged picture of the mobile device to an image resolution of the imaged picture; and wherein the generating a prompt message if the real-time scan parameter does not conform to the reference scan parameter comprises:

generating a first prompt message if the real-time picture proportion is less than the preset picture proportion, wherein the first prompt message is used to prompt the user to move the mobile device to approach the target object; or generating a second prompt message if the real-time picture proportion is greater than the preset picture proportion, wherein the second prompt message is used to prompt the user to move the mobile device away from the target object; or wherein if the preset target type is a portrait, the determining a reference scan parameter corresponding to the preset target type comprises:

obtaining a preset scanning speed corresponding to the portrait to use the preset scanning speed as the reference scan parameter;

wherein the obtaining a real-time scan parameter used when the target object is scanned comprises:

obtaining a real-time scanning speed used when the mobile device scans the target object, wherein the real-time scanning speed is a real-time moving speed of the mobile device during a process during which the mobile device performs scanning around the portrait; and wherein the generating a prompt message if the real-time scan parameter does not conform to the reference scan parameter comprises:

generating a third prompt message if the real-time scanning speed is greater than the preset scanning speed, wherein the third prompt message is used to prompt the user to reduce the moving speed of the mobile device.

4. The mobile device according to claim 3, wherein the mobile device further comprises an antenna system, wherein the antenna system transceives, under control of the at least one processor, a wireless communication signal to implement wireless communication with a mobile communications network.

5. The mobile device according to claim 4, wherein the mobile communications network comprises one or more of the following: a GSM network, a CDMA network, a 3G network, an FDMA network, a TDMA network, a PDC network, a TACS network, an AMPS network, a WCDMA network, a TDSCDMA network, a WIFI network, or an LTE network.

* * * * *